US010196471B1

(12) United States Patent
Gherardi et al.

(10) Patent No.: US 10,196,471 B1
(45) Date of Patent: Feb. 5, 2019

(54) CURABLE COMPOSITION HAVING AN ELECTRON DEFICIENT OLEFIN

(75) Inventors: Stefano Gherardi, Dublin (IE); Ciaran B. McArdle, Dublin (IE); Ligang Zhao, Goettinger (DE)

(73) Assignees: Henkel IP & Holding GmbH, Duesseldorf (DE); Henkel AG & Co. KGaA, Duesseldorf (DE)

( * ) Notice: Subject to any disclaimer, the term of this patent is extended or adjusted under 35 U.S.C. 154(b) by 769 days.

(21) Appl. No.: 12/603,966

(22) Filed: Oct. 22, 2009

Related U.S. Application Data

(60) Provisional application No. 61/108,212, filed on Oct. 24, 2008.

(51) Int. Cl.
| | |
|---|---|
| *C08F 222/32* | (2006.01) |
| *C09J 4/04* | (2006.01) |
| *C08F 216/14* | (2006.01) |
| *C09J 135/02* | (2006.01) |
| *C08F 220/42* | (2006.01) |
| *C09J 4/00* | (2006.01) |
| *C09J 133/18* | (2006.01) |
| *C09J 135/04* | (2006.01) |

(52) U.S. Cl.
CPC ...... *C08F 222/32* (2013.01); *C08F 216/1416* (2013.01); *C08F 220/42* (2013.01); *C08F 2222/328* (2013.01); *C09J 4/00* (2013.01); *C09J 133/18* (2013.01); *C09J 135/02* (2013.01); *C09J 135/04* (2013.01)

(58) Field of Classification Search
CPC .............. C08F 216/1416; C08F 220/36; C08F 220/42; C08F 220/282; C08F 220/283; C08F 222/32; C08F 2222/328; C09J 4/00; C09J 133/14; C09J 133/18; C09J 135/02; C09J 135/04
See application file for complete search history.

(56) References Cited

U.S. PATENT DOCUMENTS

| | | | |
|---|---|---|---|
| 2,363,464 | A | 11/1944 | Senkus |
| 2,413,249 | A | 12/1946 | Senkus |
| 2,413,250 | A | 12/1946 | Senkus |
| 2,415,046 | A | 1/1947 | Senkus |
| 2,582,128 | A | 1/1952 | Hurwitz |
| 2,721,858 | A | 10/1955 | Joyner et al. |
| 2,756,251 | A | 7/1956 | Joyner et al. |
| 2,763,677 | A | 9/1956 | Jeremias |
| 2,870,193 | A | 1/1959 | Pollack et al. |
| 3,048,615 | A | 8/1962 | Fields |
| 3,142,698 | A | 7/1964 | Halpern et al. |
| 3,221,745 | A | 12/1965 | Coover, Jr. et al. |
| 3,282,773 | A | 11/1966 | Wicker |
| 3,554,987 | A | 1/1971 | Smith |
| 3,903,055 | A | 9/1975 | Buck |
| 3,975,422 | A * | 8/1976 | Buck .............. 558/427 |
| 3,988,299 | A | 10/1976 | Malofsky |
| 3,995,641 | A | 12/1976 | Kronenthal et al. |
| 4,003,942 | A | 1/1977 | Buck |
| 4,012,402 | A | 3/1977 | Buck |
| 4,013,703 | A | 3/1977 | Buck |
| 4,056,543 | A | 11/1977 | Ponticello |
| 4,160,864 | A | 7/1979 | Ponticello |
| 4,202,920 | A | 5/1980 | Renner et al. |
| 4,364,876 | A | 12/1982 | Kimura et al. |
| 4,440,910 | A | 4/1984 | O'Connor |
| 4,512,357 | A | 4/1985 | Earl |
| 4,556,700 | A | 12/1985 | Harris et al. |
| 4,560,723 | A | 12/1985 | Millet |
| 4,582,648 | A | 4/1986 | Hirakawa |
| 4,587,059 | A | 5/1986 | Harth et al. |
| 4,622,414 | A | 11/1986 | McKervey |
| 4,636,539 | A | 1/1987 | Harris et al. |
| 4,695,615 | A | 9/1987 | Leonard et al. |
| 4,718,966 | A | 1/1988 | Harris et al. |
| 4,764,545 | A | 8/1988 | Yoshida |
| 4,837,260 | A | 6/1989 | Sato et al. |
| 4,855,461 | A | 8/1989 | Harris |
| 4,876,045 | A | 10/1989 | Longo et al. |
| 4,906,317 | A | 3/1990 | Liu |
| 5,142,098 | A | 8/1992 | Bru-Magniez et al. |
| 5,288,794 | A | 2/1994 | Attarwala |
| 5,306,752 | A | 4/1994 | Attarwala |
| 5,312,864 | A | 5/1994 | Wenz et al. |
| 5,328,944 | A | 7/1994 | Attarwala et al. |
| 5,340,873 | A | 8/1994 | Mitry |
| 5,359,101 | A | 10/1994 | Woods et al. |
| 5,386,047 | A | 1/1995 | Nakos et al. |
| 5,424,343 | A | 6/1995 | Attarwala |
| 5,424,344 | A | 6/1995 | Lewin |
| 5,455,369 | A | 10/1995 | Meier et al. |
| 5,624,699 | A | 4/1997 | Lang |
| 5,703,267 | A | 12/1997 | Takahashi et al. |

(Continued)

FOREIGN PATENT DOCUMENTS

| | | |
|---|---|---|
| DE | 2 626 173 | 12/1977 |
| DE | 40 34 080 A1 | 6/1991 |

(Continued)

OTHER PUBLICATIONS

Samantha et al., Polym.-Plast. Technol. Eng. 39 (2000) 381-392.*
Carl J. Buck, Unequivocal Synthesis of Bis(2-Cyanoacrylate) Monomers, I. Via Anthracene Adducts, *Journal of Polymer Science, Polymer Chemistry Edition*, vol. 16, 2475-507 (1978).
G. Jones, "The Knoevenagle Condensation", *Organic Reactions*, vol. XV, 204, Wiley New York (1967).
F. Bigi et al., "Montmorillonite KSF as an Inorganic, Water Stable, and Reusable Catalyst for the Knoevenagel Synthesis of Coumarin-3-carboxylic Acids", *Journal Organic Chemistry*, vol. 64, 1033-35 (1999).
B. Green et al., Synthesis of Steroidal 16, 17-Fused Unsaturated δ-Lactones[1], *Journal Organic Chemistry*, vol. 50, 640-44 (1985).
P. Rao et al., "Zinc Chloride As A New Catalyst For Knoevenagel Condensation", *Tetrahedron Letters*, vol. 32, No. 41, 5821-22 (1991).

(Continued)

*Primary Examiner* — Roberto Rabago
(74) *Attorney, Agent, or Firm* — Steven C. Bauman

(57) ABSTRACT

The invention relates to a curable composition having an electron deficient olefin.

18 Claims, No Drawings

(56) References Cited

U.S. PATENT DOCUMENTS

| | | | |
|---|---|---|---|
| 5,744,642 A | | 4/1998 | Lantzsch et al. |
| 5,994,464 A | | 11/1999 | Ohsawa |
| 6,093,780 A | | 7/2000 | Attarwala |
| 6,096,848 A | | 8/2000 | Gololobov et al. |
| 6,174,919 B1 | * | 1/2001 | Hickey .......... 514/519 |
| 6,245,933 B1 | | 6/2001 | Malofsky et al. |
| 6,291,544 B1 | | 9/2001 | Kotzev |
| 6,294,629 B1 | * | 9/2001 | O'Dwyer et al. .......... 526/297 |
| 6,531,460 B1 | | 3/2003 | Takenouchi et al. |
| 6,833,196 B1 | | 12/2004 | Wojciak |
| 6,835,789 B1 | | 12/2004 | Kneafsey et al. |
| 2005/0215744 A1 | * | 9/2005 | Wiese .......... B29C 67/0059 526/319 |
| 2006/0094833 A1 | | 5/2006 | McDonnell et al. |
| 2006/0269870 A1 | | 11/2006 | Harada et al. |
| 2007/0072998 A1 | * | 3/2007 | Masuda et al. .......... 525/165 |
| 2008/0139720 A1 | * | 6/2008 | Li et al. .......... 524/401 |
| 2008/0241249 A1 | | 10/2008 | Quintero et al. |
| 2010/0210788 A1 | * | 8/2010 | McArdle et al. .......... 524/850 |

FOREIGN PATENT DOCUMENTS

| | | |
|---|---|---|
| DE | 19519958 | 12/1995 |
| EP | 0 127 855 | 12/1984 |
| EP | 0 267 981 A | 5/1988 |
| EP | 0 459 617 A1 | 12/1991 |
| JP | 11106372 | 4/1999 |
| WO | WO 94/15590 A1 | 7/1994 |
| WO | WO 94/15907 | 7/1994 |
| WO | WO 95/32183 | 11/1995 |
| WO | WO 99/14206 A1 | 3/1999 |
| WO | 0112243 | 2/2001 |
| WO | WO 03/006225 A1 | 1/2003 |
| WO | WO 03/086605 A2 | 10/2003 |

OTHER PUBLICATIONS

J. S. Yadav et al., "Phosphane-Catalyzed Knoevenagel Condensation: A Facile Synthesis of α-Cyanoacrylates and α-Cyanonitriles", *European Journal Organic Chemistry*, 546-51 (2004).
L. Tietze et al., Comprehensive Organic Synthesis, Pergamon Press, Oxford, vol. 2, Chapter 1.11, 341 (1991).
P. Laszlo, "Catalysis of Organic Reactions by Inorganic Solids", *Accounts of Chemcial Research*, vol. 19, 121-27 (1986).
K. Kloestra et al., "Base and Acid Catalysis by the Alkali-containing MCM-41 Mesoporous Molecular Sieve", *Journal Chemical Soc. Chem. Commun.*, 1005-06 (1995).
P. Lednor et al., "The Use of a High Surface Area Silicon Oxynitride as a Solid, Basic Catalyst", *Journal Chemical Society, Chem. Commune.*, 1625-26(1991).
F. Bigi et al., "A Revision of the Biginelli Reaction Under Solid Acid Catalysis. Solvent-free Synthesis Of Dihydropyrimidines Over Montmorillonite KSF", *Tetrahedron Letters*, vol. 40, 3465-68 (1999).
F. Bigi et al., "Clean synthesis in water: uncatalysed preparation of ylidenemalononitriles", *Green Chemistry*, vol. 2, 101-03 (2000).
R. Breslow, "Hydrophobic Effects on Simple Reactions in Water", *Accounts of Chemical Research*, vol. 24, 159-64 (1991).
C. Li, "Organic Reactions in Aqueous Media—With a Focus on Carbon-Carbon Bond Formation", *Chemical Reviews*, vol. 93, 2023-35 (1993).
T. Welton, "Room Temperature Ionic Liquids. Solvents for Synthesis and Catalysis", *Chemical Reviews*, vol. 99, 2071-83 (1999).
D. Morrison et al., "Base-promoted reactions in ionic liquid solvents. The Knoevenagel and Robinson annulation reactions", *Tetrahedron Letters*, vol. 42, 6053-55 (2001).
Fraga-Dubreiul et al., "Grafted ionic liquid-phase-supported snythesis of small organic molecules", *Tetrahedron Letter*, vol. 42, 6097-6100 (2001).
M. Smietana et al., "Preparation of Silyl Enol Ethers Using (Bistrimethylsilyl)acetamide in Ionic Liquids", *Organic Letters*, vol. 3, No. 7, 1037-39 (2001).

Li et al., "n-Butyl Pyridium Nitrate as a Reusable Ionic Liquid Medium for Knoevenagel Condensation", *Chinese Chemical Letters*, vol. 14, No. 5, 448-50 (2003).
J. Harjani et al., "Lewis acidic ionic liquids for the synthesis of electrophilic alkenes via the Knoevenagel condensation", *Tetrahedron Letters*, vol. 43, 1127-30 (2002).
Xu et al., "Knoevenagel condensation Reaction Catalyzed by Functionalized Ionic Liquid 1-(2-Hydroxyethyl)-3-methyl Imidazolium Chloride", *Chinese Journal of Organic Chemistry*, vol. 24(10), 1253-56 (2004).
Su et al., "Organic Reactions in Ionic Liquids: Knoevenagel Condensation Catalyzed by Ethylenediammonium Diacetate", *Synthesis 2003*, No. 4, 555-59 (2003).
Moehrle et al., "Aminomethylierung von 1,3-Diketonen", *Pharmazie*, vol. 40, 697-701 (1985).
J. March, "Reactions", *Advanced Organic Chemistry*, $3^{rd}$ Edition, Wiley & Sons Inc., 417 (1985).
J. March, "Addition to Carbon-Hetero Multiple Bonds", *Advanced Organic Chemistry*, $3^{rd}$ Edition, Wiley & Sons, 802-03 (1985).
M. B. Smith, *Organic Synthesis*, McGraw-Hill International Chemistry Series, 1302 (1994).
Tehrani et al., "Product Class 8: Iminium Salts", *Science of Synthesis*, vol. 27, 313-48 (2004).
B. Hin et al., "Facile Synthesis of α-Substituted Acrylate Esters", *Journal of Organic Chemistry*, vol. 67, 7365-68 (2002).
Holy et al., "The Mannich Reaction-II Derivatization of Aldehydes and Ketones using Dimethyl(methylene)ammonium Salts", *Tetrahedron Letters*, vol. 35, 613-19 (1979).
Bryson et al., "Performed Mannich Salts: A Facile Preparation of Dimethyl(methylene)ammonium Iodide", *Journal of Organic Chemistry*, vol. 45, 524-25 (1980).
J. March, "The Pinacol Rearrangement", *Advanced Organic Chemistry*, $3^{rd}$ Edition, Wiley & Sons, 963-64 (1985).
J. March, "Free-Radical Substitution", *Advanced Organic Chemistry*, $3^{rd}$ Edition, Wiley & Sons, 642 (1985).
Jahn et al., "A Novel and Simple Method for the Preparation of Iminium Salts", *Tetrahedron Letters*, vol. 34, No. 37, 5863-66 (1993).
R. J. Vijin et al., Synthesis, 573 (1994).
Davis, "Chemistry Letters", vol. 33, Issue 9, 1072-77 (2004).
Davis et al., "Ionic Liquids in Synthesis", P. Wasserscheid and T. Welton, eds., Wiley-VCH Verlag GmbH & Co. KGaA, Chapter 2 (2002).
M.G. Djamali, P. Burba, K.H. Lieser, "Synthese und Eigenschaften eines Celluloseaustauschers mit Diaminodibenzo-18-Krone-6 als Ankergruppe", *Die Angewandte Makromolecular Chemie*, vol. 92, 145-54 (1980).
K. Babic, "Reactive and Functional Polymers", vol. 66, 1494-1505 (2006).
Trumbo et al., "Copolymerization Behavior of 3-Isopropenyl-α,α-Dimethylbenzylamine and a Preliminary Evaluation of the Copolymers in Thermostat Coatings", *Journal of Applied Polymer Science*, vol. 82, 1030-39 (2001).
T. Giesenberg et al., "Synthesis and Functionalization of a New Kind of Silica Particle." *Agnew. Int. Chem. Int. Ed.*, 43, 5697-5700 (2004).
Zhang et al., "An Investigation of Knoevenagel condensation reaction zeolite catalyst", *Applied Catalysis A: General*, 261, 109-118 (2004).
Mehnert et al., "Chemical Communications", 3010 (2002).
Lee and Lee, "Bulletin of the Korean Chemical Society" vol. 25, Issue 10, 1531-37 (2004).
H. R. Snyder and W. E. Hamlin, "Alkylation of Nitroparaffins with Amines and Their Derivatives", *Journal of American Chemical Society*, vol. 72, 5082-85 (1950).
H. G. Johnson, "Reaction of Aliphatic Amines with Formaldehyde and Nitroparaffins. II. Secondary Amines", *Journal of American Chemical Society*, vol. 68, 12-14 (1946).
M. Semkus, "Journal of the American Chemical Society", vol. 68, 10-12 (1946).
Sarac, "Progress in Polymer Science", vol. 24, 1149-1201 (1999).
Brough et al., "Pyrimidinyl Nitronyl Nitroxides", *Chemical European Journal*, vol. 12, 5134 (2006).

(56) References Cited

OTHER PUBLICATIONS

Zhou et al., *J. Polym. Sci., Part A Polym. Chem. Ed.*, 29, 1097 (1991).
Mehrotra et al., "Journal of Organometalic Chemistry", vol. 24, 611-21 (1970).
Son et al., "Synthesis of Hexahydro-3,3,5,5,7-pentaalkyl-2H-1,4-diazepin-2-ones from 1,3-Diamines And Ketones", *J. Org. Chem.*, vol. 46, 323 (1981).
Senkus, Acetals of Nitro Alcohols and Corresponding Amino Acetals, *J. Amer. Chem. Soc.*, vol. 69, 1380-81 (1947).
Renner et al., "Cure of Epoxy Resins with Esters of Cyanoacrylic Acid", *Journal of Polymer Science: Polymer Chemistry Edition*, vol. 23, 2341 (1985).
Kennedy et al., "Macromers by Carbocationic Polymerization. X. Synthesis, Characterization, and Polymerizability of Cyanoacrylate-Capped Polyisobutylenes", *Journal of Macromolecular Science, Part A, 28:2*, 209-24 (1991).
Khrustalev et al., "Synthesis and X-ray structural study of 1-adamantylmethy 2-cyanoacrylatel And 1,10-decanediol bis-2-cyanoacrylate", *Russian Chemical Bulletin*, vol. 45, No. 9, 2172 (1996).
Y. Gololobov et al., "A novel approach to the synthesis of bis(2-cyanoacrylates)", *Russian Chemical Bulletin*, vol. 42, No. 5, 961 (1993).
Y. Gololobov et al., "Synthesis of bis(2-cyanoacrylates) from 2-cyanoacryloyl chloride and 2-butene-and 2-butyne-1,4-diols", *Russian Chemical Bulletin*, vol. 44, No. 4, 760 (1995).
J.-L. De Keyser et al., "A Versatile and Convenient Multigram Synthesis of Methylidenemalonic Acid Diesters", *J. Org. Chem.*, vol. 53, 4859 (1988).
Vijayalakshmi et al., "Alkyl and substituted alkyl 2-cyanoacrylates. Part 1. Synthesis and Properties", *J. Adhesion Science Technology*, vol. 4, No. 9, 733 (1990).
Guseva et al., "Organic Chemistry. Synthesis of functionality substituted cyanoacetates." *Russian Chemical Bulletin*, vol. 42, No. 3, 478 (1993).
Guseva et al., "Organic Chemistry" *Russian Chemical Bulletin*, vol. 43, No. 4, 595 (1995).
Gololobov and Gruber, Russian Chemical Review, vol. 66, Issue 11, 953 (1997).
Senchenya et al., "Silicon-containing esters of α-cyanoacrylic acid: synthesis and properties" *Russian Chemical Bulletin*, vol. 42, No. 5, 909 (1993).
Bowie J. H. et al., "Tetrahedron", vol. 23, 305-20 (1967).
J. S. Norwick et al., J. Org. Chem., 57(28) 7364-66 (1992).
International Search Report for International Patent Application No. PCT/EP2008/064489 dated Dec. 30, 2008.
International Search Report for International Patent Application No. PCT/EP2008/064490 dated May 4, 2009.
International Search Report for International Patent Application No. PCT/EP2008/064488 dated Jul. 16, 2009.
H.C. Haas, et al., "Carbamylmethyl Esthers Of Unsaturated Acids"; Journal of Polymer Science: vol. XXXVII, Issue 131; pp. 317-319; 1959, (XP002518680).
J.L. De Keyser et al., "A versatile and convenient muligram synthesis of methylidenamalonic acid diesters", J. Org. Chem., pp. 4859-48562, (1988) (XP002518681).
X. Yang; Organic Preparations And Procedures International; vol. 30, No. 2; pp. 239-242; 1998 (XP002518684).
P.H. Mason, et al., "A New Route To Substituted Gluatric Acid Derivatives From Allylic Malonates"; Synthetic Communications; vol. 25(2); pp. 183-190; 1995.
T. Sato, et al., "Synthesis Of Copper (II) Chelate Of ethyl a-(acetoacetoxymethyl)acrylate And Its Radical-Initiated Polymerization"; Makromol. Chem., Rapid Commun. vol. 11; pp. 553-557; 1990.
M.L. Meketa, et al., "An Efficacious Method For The Halogenation Of .beta.-dicarbonyl Compounds Under Mildly Acidic Conditions"; Tetrahedron Letter; vol. 46(28); pp. 4749-4751; 2005, XP002520970.
M.L. Meketa, et al., "An Efficacious Method For The Halogenation Of .beta.-dicarbonyl Compounds Under Mildly Acidic Conditions"; Tetrahedron Letter; vol. 46(28); pp. 4749-4751; 2005, XP002520971.
R.C. Cookson, et al., "2-Phenylthioallyl Alcohols And Their Use In The Synthesisi of 1,4-diketones And Cyclopentenones"; Journal Of Chemical Society, Chemical Communications; (23); p. 990; 1976, XP002520969.
P.H. Mason, et al., "Some Mechanistic and Synthetic Aspects Of the DABCO Catalyzed Rearrangement of Allylic Esters"; Tetrahedron; vol. 50(41);pp. 12001-12008, XP002520967, 1994.
Samatha, et al., "Effect of Addition Acrylates on the Performance of Ethyl Cyanoacrylate Adhesive", Polym.—Plast. Technol. Eng., 39(2), 381-92, (2000).
Vijayalakshmi, et al., "Synthesis and End Use Evaluation of Pinene-based Alicyclic Acrylates", *J. Polym. Mat.*, 13, pp. 127-131 (1996).
Yamada, et al., "Determination of Absolute Rate Constants for Radical Polymerization and Copolymerization of Ethyl a-Cyanoacrylate in the Presence of Effective Inhibitors against Anionic Polymerization", Makromol. Chem., 184, 1025 (1983).
Vijayalakshmi, et al., "Synthesis of 3-Substituted-2-cyanoacrylates: Their Evaluation as Cross-linkers in Cyanoacrylate Adhesive Compositions", *J. Polym. Mat.*, 49, 1387 (1993).
Ponticello, "The Preparation of a-Substituted Acrylic Esters", *J. Polym. Sci., Polym. Chem. Edn.*, 17, pp. 3509-18 (1979).
Pines, Alul and Kolobieski, "Bromination of a-Methylstyrene with N-Bromosuccinimide, Synthesis of 2-Phenyl-1,5-hexadiene", *J. Org. Chem.*, 22, 1113 (1957).
V. Vuayalakshmi et al., "Synthesis, Characterization and Evaluation of Alkyl 2-Bromoacrylates as Adhesives", Eur. Polym. J., vol. 29, No. 10, pp. 1323-1328 (1993).

\* cited by examiner

CURABLE COMPOSITION HAVING AN ELECTRON DEFICIENT OLEFIN

BACKGROUND OF THE INVENTION

Field of the Invention

The invention relates to a curable composition having an electron deficient olefin.

Brief Description Of Related Technology

Cyanoacrylate compositions are well known as adhesives for a variety of substrates. However, traditional cyanoacrylate-based adhesives tend to be brittle after cure. A variety of additives and fillers have been added to cyanoacrylate adhesive compositions to improve toughness.

U.S. Pat. No. 4,440,910 (O'Connor) is directed to cyanoacrylate compositions having improved toughness, achieved through the addition of elastomers, i.e., acrylic rubbers. These rubbers are either (i) homopolymers of alkyl esters of acrylic acid; (ii) copolymers of another polymerizable monomer, such as lower alkenes, with an alkyl ester of acrylic acid or with an alkoxy ester of acrylic acid; (iii) copolymers of alkyl esters of acrylic acid; (iv) copolymers of alkoxy esters of acrylic acid; and (v) mixtures thereof.

U.S. Pat. No. 4,560,723 (Millet) discloses a cyanoacrylate adhesive composition containing a toughening agent comprising a core-shell polymer and an organic compound containing one or more unsubstituted or substituted aryl groups. The sustainer is reported to improve retention of toughness after heat aging of cured bonds of the adhesive. The core-shell polymer is treated with an acid wash to remove any polymerization-causing impurities such as salts, soaps or other nucleophilic species left over from the core-shell polymer manufacturing process.

U.S. Pat. No. 5,340,873 (Mitry) discloses a cyanoacrylate adhesive composition having improved toughness by including an effective toughening amount of a polyester polymer derived from a dibasic aliphatic or aromatic carboxylic acid and a glycol.

U.S. Pat. No. 5,994,464 (Ohsawa) discloses a cyanoacrylate adhesive composition containing a cyanoacrylate monomer, an elastomer miscible or compatible with the cyanoacrylate monomer, and a core-shell polymer being compatible, but not miscible, with the cyanoacrylate monomer.

The toughening agents mentioned above generate or contain acid impurities which can cause hydrolysis of the cyanoacrylate monomer, forming carboxylic acids which drastically retard cure speed and contribute to a rapid deterioration in adhesive performance. Toughening agents such as core shell polymers have been shown to be inconsistent in performance and can be difficult to formulate.

In reducing acid generation such that cure speeds and consistent adhesive performance are not inhibited, ease of formulation is not impeded, and lower concentrations of stabilizers may be used, Henkel Corporation designed and developed technology described and claimed in U.S. Pat. No. 6,833,196 (Wojciak). The '196 patent describes a cyanoacrylate adhesive composition having an acrylic monomer toughening agent, such as methyl methacrylate, butyl acrylate, cyclohexyl acrylate, isobornyl acrylate, and combinations thereof in amounts of about 1.0% by weight to about 10.0% by weight and claims a method of enhancing the toughness of a cyanoacrylate composition between steel and EPDM rubber substrates, comprising the steps of: providing a cyanoacrylate component; and providing a toughening agent comprising methyl methacrylic monomer and at least one of butyl acrylic monomer and isobornyl acrylic monomer, whereby the acrylic monomer toughening agent enhances the toughness of the cyanoacrylate composition such that whereupon cure, the cyanoacrylate composition has an average tensile shear strength of over about 4400 psi after 72 hours at room temperature sure and 2 hours post cure at 121'C.

In addition, Samatha et al., *Polym.-Plast. Technol. Eng*, 39(2), 381-92 (2000) describe the effect of adding various acrylates into cyanoacrylate formulations with a reported increase in tensile strength and thermal resistance, relative to an ethyl cyanoacrylate alone in adhesive formulations.

Vijayalakshmi et al., *J. Polym. Mat.*, 13, 127 (1996) describe vinyl hybrid compounds and the reported improvement of thermal resistance in adhesive formulations when formulated with propyl cyanoacrylate.

U.S. Pat. No. 3,282,773 (Wicker) describe cyanoacrylate formulations containing vinyl aromatic compounds such as alpha methylstyrene, p-vinyl toluene, o-chlorostyrene, 2,4-dichlorostyrene, 4,4-dimethylstyrene and divinyl benzene. In the '773 patent, the vinyl aromatic compounds were not stable in a one-part formulation. Thus, the two components were mixed together upon which the vinyl aromatic compounds spontaneously polymerised with the cyanoacrylates.

International Patent Publication No. WO 94/15907 describes the synthesis of a hybrid cyanoacrylate-methacrylate made by esterifying 2-cyanoacrylic acid with 2-hydroxyethylmethacrylate. A schematic representation of the synthesis is provided below

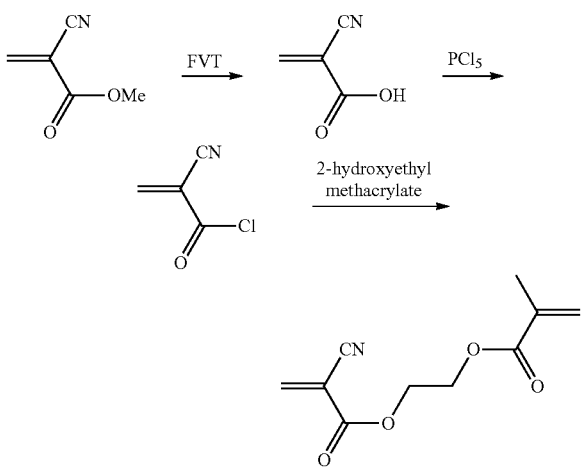

International Patent Publication No. WO 95/32183 describes a process to make the 2-cyanoacrylic ester of 1,4-butanediol monomethacrylate.

U.S. Pat. No. 6,174,919 B1 refers to cyanoacrylate hybrid compounds that have vinyl functional groups. See also U.S. Pat. No. 3,995,641 to which reference is made therein Yamada et al., *Makromol. Chem.*, 184, 1025 (1983) describe the free radical polymerisation and copolymerisation characteristics of cyanoacrylates inhibited against anionic polymerisation.

Vijayalakshmi et al., *J. Appl. Polym. Sci.*, 49, 1387, (1993) describe 3-substituted 2-cyanoacrylates (cyanopentadienoates and beta substituted bis-cyanopentadienoates) and their use as crosslinkers for 2-cyanoacrylates in adhesive formulations for reportedly improved thermal resistance of such adhesive formulations.

Buck, J., *Polym. Sci., Polym. Chem Edn.*, 16, 2475 (1978) describes the synthesis of bis(2-cyanoacrylates) and reports that formulations of ethyl, isobutyl, n-amyl, isoamyl, n-hexyl and n-heptyl cyanoacrylate with biscyanoacrylates, such as ethylenegylcol bis-cyanoacrylate, have improved tensile and moisture resistance.

Ponticello, *J. Polym. Sci., Poly Chem. Edn.*, 17, 3509 (1979) describes the synthesis of a methylidene malonate bearing an oxirane moiety.

Notwithstanding the state of the technology it would be desirable to provide curable compositions having electron deficient olefins and compounds having at least two reactive functional groups, at least one of which reactive functional group being an electron deficient olefin functional group.

SUMMARY OF THE INVENTION

The present provides broadly in one aspect a curable composition comprising:
(a) at least one electron deficient olefin; and
(b) at least one compound having at least one electron deficient olefin functional group and at least one functional group selected from
  (i) (meth)acrylic esters,
  (ii) acrylonitriles,
  (iii) acrylamides,
  (iv) styryl functional groups, or
  (v) electron deficient olefin functional groups.

In addition, as component (c) a cure system may optionally be included.

Also, as optional component (d) at least one compound other than component (b) having at least one functional group selected from
  (i) (meth)acrylic esters,
  (ii) acrylonitriles,
  (iii) acrylamides, or
  (iv) styryl functional groups, and combinations thereof may be included.

In another aspect the invention provides a method of preparing the so described compositions.

In still another aspect the invention provides a method of using the so described compositions to bond together two or more substrates.

In yet another aspect the invention provides reaction products of the so described compositions.

DETAILED DESCRIPTION OF THE INVENTION

As noted above, the present provides broadly in one aspect a curable composition comprising:
(a) at least one electron deficient olefin; and
(b) at least one compound having at least one electron deficient olefin functional group and at least one functional group selected from
  (i) (meth)acrylic esters,
  (ii) acrylonitriles,
  (iii) acrylamides,
  (iv) styryl functional groups, or
  (v) electron deficient olefin functional groups.

In addition, as component (c) a cure system may optionally be included.

Also, as optional component (d) at least one compound other than component (b) having at least one functional group selected from
  (i) (meth)acrylic esters,
  (ii) acrylonitriles,
  (iii) acrylamides, or
  (iv) styryl functional groups, and combinations thereof may be included.

The electron deficient olefin of (a) may be selected from 2-cyanoacrylates, methylidene malonates, cyanopentadienoates and combinations thereof. Of course, multifunctional versions of these electron deficient olefins where the functionality may be the same or different are also embraced by the term "electron deficient olefin".

The 2-cyanoacrylate may be within structure I:

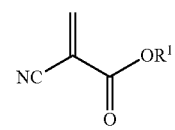

I where $R^1$ is selected from $C_{1-16}$ alkyl, alkoxyalkyl, cycloalkyl, alkenyl, alkynyl, arylalkyl, aryl, allyl and haloalkyl groups. For instance, the 2-cyanoacrylate may be selected from methyl cyanoacrylate, ethyl cyanoacrylate, propyl cyanoacrylates, butyl cyanoacrylates, octyl cyanoacrylates, allyl cyanoacrylate, propargyl cyanoacrylate, β-methoxyethyl cyanoacrylate and combinations thereof.

The methylidene malonate may be within structure II:

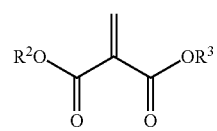

II where $R^2$ and $R^3$ are each independently selected from alkyl, alkoxyalkyl, cycloalkyl, haloalkyl, alkenyl, alkynyl, aryl, arylalkyl, oxirane, thiirane, oxetane, alkoxyalkyl, cycloalkyl, alkenyl, alkynyl, arylalkyl, aryl, allyl and haloalkyl groups. For instance, $C_{1-16}$ alkyl or $C_{2-16}$ dialkyl (such as dimethyl or diethyl) methylidene malonates, $C_{2-16}$ alkyl or $C_{4-16}$ dialkenyl (such as diallyl) methylidene malonates, or alkyl alkenyl (such as methylallyl methylenemalonate described in U.S. Pat. Nos. 4,056,543 4,160,864) or methylidene malonic diesters described in U.S. Pat. No. 5,142,098 and De Keyser et al., *J. Org. Chem.*, 53, 4859 (1988).

The cyanopentadienoates may be within structure

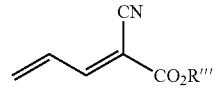

where R'" is alkyl, alkenyl, or alkoxy.

For instance, when R'" is ethyl, allyl, methoxyethyl, or ethoxyethyl, 2-cyano-2,4-pentadienoates are presented, such as are described in U.S. Pat. No. 6,291,544.

The compounds of (a) should be present in the curable composition in an amount of between 5 and 95% by weight of the composition.

The compounds of (b) having at least one electron deficient olefin functional group and at least one functional group selected from (i) (meth)acrylic esters,
(ii) acrylonitriles,
(iii) acrylamides,
(iv) styryl functional groups, or
(v) electron deficient olefin functional groups, are embraced by structure III

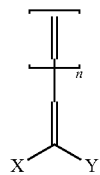
III where X is (i) an electron withdrawing group, or
(ii) Y;
Y is

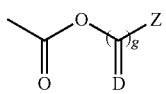

where D is selected from H, alkyl and aryl,
Z, attached via the Q substituted carbon, is either
(a)

where Q is
  i. an electron withdrawing group or
  ii. a first reactive functionality,
(b)

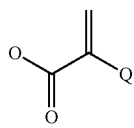

where Q is an electron withdrawing group, a $C_{1-4}$ alkyl group, a phenyl or substituted phenyl group, or
(c) a second reactive functionality,
g is 1-12; and
n is 0 or 1.
Where X in the compound of structure III is an electron withdrawing group, X may be selected from CN, $CO_2R$, $CO_2H$, COCl, COR, $COPO(OR)_2$, $COPOR_2$, $SO_2R$, $SO_3R$ and $NO_2$, where R is $C_{1-4}$. X may also be Y, as noted above.
Y in the compound of structure III is

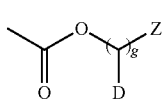

where D is selected from H, alkyl or aryl, Z attached to a Q substituted carbon is

or Z is

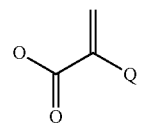

where Q is
(a) an electron withdrawing group selected from CN, $CO_2R$, $CO_2H$, COCl, COR, $COPO(OR)_2$, $COPOR_2$, $SO_2R$, $SO_3R$ or $NO_2$, where R is $C_{1-4}$,
(b) a first reactive functionality selected from amides or thioamides, or
(c) a $C_{1-4}$ alkyl group, or a phenyl or substituted phenyl group, and
g is 1.
Y may also be

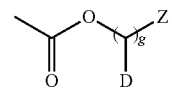

where D is selected from H, alkyl or aryl, Z is a second reactive functionality selected from acrylonitrile, (meth)acrylates, acrylamindes, styrenes, maleimides, itaconimides, or nadimides, and g is 1.
The free radically curable functional group on the compound embraced by structure III is selected from (meth)acrylates, acrylonitriles, acrylamides, styrenes, maleimides, itaconimides, or nadimides.
The ionically curable functional group on the compound embraced by structure III is selected from cyanoacrylates, methylidene malonates or cyanopentadienoates.
Structure III of component (b) also embraces more specifically structure IV

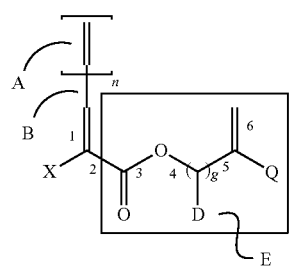
IV where X is an electron withdrawing group or E,
E is as shown,

is a reactive functionality, D is selected from H, alkyl or aryl, n is 0 or 1, g is 1, and A, B, 1, 2, 3, 4, 5, and 6 are each references to bond designations.

Structure III of compound (b) may also embrace more specifically structure V

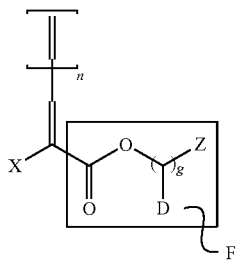

where X is an electron withdrawing group or F, D is selected from H, alkyl or aryl, Z is a reactive functionality (such as a second reactive functionality selected from acrylonitrile, (meth)acrylates, acrylamindes, styrenes, maleimides, itaconimides, or nadimides),

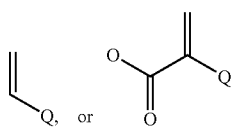

where Q is (a) an electron withdrawing group selected from CN, $CO_2R$, $CO_2H$, COCl, COR, $COPO(OR)_2$, $COPOR_2$, $SO_2R$, $SO_3R$ or $NO_2$, where R is $C_{1-4}$, (b) a first reactive functionality selected from amides or thioamides, or (c) a $C_{1-4}$ alkyl group, or a phenyl or substituted phenyl group, n is 0 or 1 and g is 1.

Representative examples of compound (b) include cyanoacryloyloxy-alphamethylethacrylate, cyanoacryloyloxymethylalphamethylacrylonitrile, and cyanoacryloyloxy-ethylmethacrylate.

Examples of compounds of (b) may be selected from the specific compounds listed below

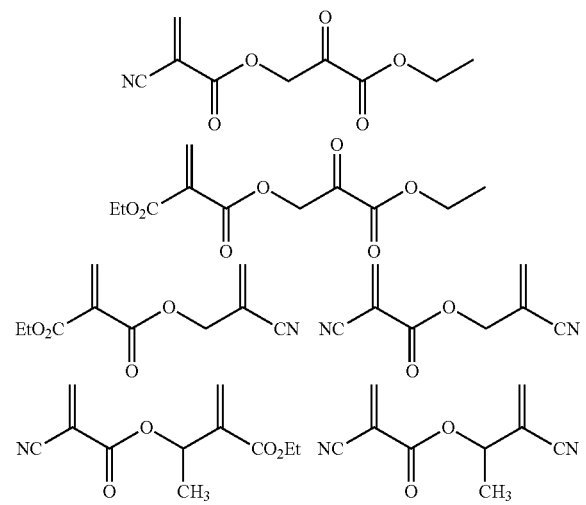

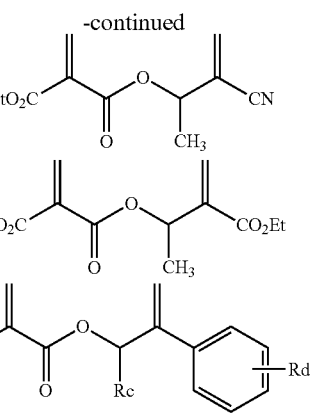

where Rc is H or $CH_3$ and Rd is H, p-MeO or p-$CH_3$

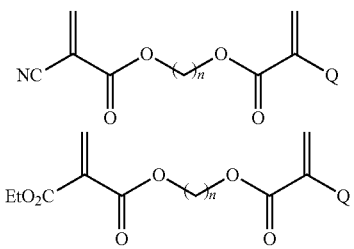

where in the last two compounds n is 2, 3 or 4 and Q is H or $CH_3$, desirably n is 2 and Q is $CH_3$.

Examples of such multifunctional electron deficient olefins include bis-cyanoacrylates, bis-methylidene malonates, and bis-cyanopentadienoates.

Bis-cyanoacrylates are embraced by structure IA

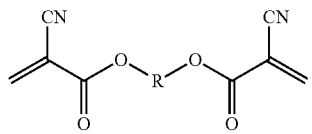

where R in structure IA is selected from $(CH_2)_n$, with n being 2, 3, 4, 5, 6, 8, 9, 10, or 12, such as a linear or branched chain alkylene like $CH(CH_3)CH_2CH_2$, $CH_2C(CH_3)_2CH_2$ or $CH(CH_3)CH_2CH_2CH(CH_3)$, or alkylene substituted by halogen like fluorine such as $CH_2(CF_2)_2CH_2$ or interrupted by a heteroatom like oxygen or silyloxy such as $(CH_2)_4O(CH_2)_4$ or $CH_2Si(CH_3)_2OSi(CH_3)_2CH_2$, respectively; alkenyl such as $CH_2CH=CHCH_2$ or alkynyl such as

or arylene like phenylene such as

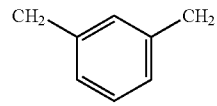

or

respectively.

Of course, multifunctional versions of the compounds of (b) where the functionality may be the same or different are also embraced. Examples of such multifunctional versions include multi (meth)acrylates, like di(meth)acrylates and tri(meth)acrylates, and divinyl benzene.

The compounds of (b) should be present in the curable composition in an amount of between 0.5 and 50% by weight.

The cure system of (c) assists cure by a free radical mechanism, an ionic initiation, or a condensation reaction.

The cure system when assisting cure by way of a free radical mechanism may be selected from thermal initiators, photoinitiators, metal catalysts, exposure to air or by removal of air. Here, the free radical cure system should be present in an amount of about 1-3% by weight. The cure system may also involve the substrate itself to which compositions according to the invention are applied.

The cure system when assisting cure by way of an ionic initiation may be selected from onium salts for example, such as substituted or unsubstituted diphenyl iodonium or triphenyl sulfonium salts bearing non nucleophilic anions such as $AsF_6$, $SbF_6$, $PF_6$, $BF_4$ and others well known to those skilled in the art of cationic polymerisation. Metal salts may also be used here with similar non-nucleophilic counterions. Here, the ionic initiated cure system should be present in an amount of about 1-3% by weight.

The cure system when assisting cure by way of a condensation reaction involve monomers reactive towards moisture such as those bearing alkoxy silane or isocyanate functions and may further comprise cure catalysts, such as tin or zinc octanoates or laurylates. Here, the condensation cure system should be present in an amount of 0.1-10% by weight with respect to the monomers and 1-3% by weight with respect to any catalysts used.

The curable composition so defined may also include (d) at least one compound other than compounds of (b) having at least one curable functional group other than an electron deficient olefin. This curable functional group may be free radically curable, ionically curable or condensation curable.

Where the curable functional group on the compound of (d) is a free radically curable functional group examples include (meth)acrylates, acrylonitriles, acrylamides, vinyls, allyls, styrenes, maleimides, itaconimides, and nadimides. Examples of (meth)acrylates for instance include 2(2-ethoxyethoxy) ethyl (meth)acrylate, 2-phenoxyethyl (meth) acrylate, 3,3,5 trimethylcyclohexyl (meth)acrylate, alkoxylated lauryl (meth)acrylate, alkoxylated phenol (meth) acrylate, alkoxylated tetrahydrofurfuryl (meth)acrylate, caprolactone (meth)acrylate, cyclic trimethylolpropane formal (meth)acrylate, dicyclopentadienyl (meth)acrylate, diethylene glycol methyl ether (meth)acrylate, ethoxylated hydroxyethyl (meth)acrylates, ethoxylated nonyl phenol (meth)acrylates, isobornyl (meth)acrylate, isodecyl (meth) acrylate, isooctyl (meth)acrylate, lauryl (meth)acrylate, methoxy polyethylene glycol mono(meth) acrylates, octyldecyl (meth)acrylate, propoxylated allyl (meth)acrylates, stearyl (meth)acrylate, tetrahydrofurfuryl (meth)acrylates, tridecyl (meth)acrylate, triethylene glycol ethyl ether (meth) acrylates, 1,12-dodecanediol di(meth)acrylate, 1,3-butylene glycol di(meth)acrylate, 1,4-butanediol di(meth)acrylate, 1,6-hexanediol di(meth)acrylate, alkoxylated aliphatic di(meth)acrylate, alkoxylated cyclohexane dimethanol di(meth)acrylate, alkoxylated hexanediol di(meth)acrylate, alkoxylated neopentyl glycol di (meth)acrylate, cyclohexane dimethanol di(meth)acrylate, diethylene glycol di(meth) acrylate, dipropylene glycol di(meth)acrylate, ethoxylated bisphenol a di(meth)acrylates, ethylene glycol di(meth)acrylate, neopentyl glycol di(meth)acrylate, polyethylene glycol di(meth)acrylates, polypropylene glycol di(meth)acrylates, tetraethylene glycol di(meth)acrylate, tricyclodecane dimethanol di(meth)acrylate, triethylene glycol di(meth)acrylate, tripropylene glycol di(meth)acrylate, di-trimethylolpropane tetra(meth)acrylate, dipentaerythritol penta(meth)acrylate, ethoxylated pentaerythritol tetra(meth)acrylates, pentaerythritol tetra(meth)acrylate, ethoxylated trimethylolpropane tri (meth)acrylates, pentaerythritol tri(meth)acrylate, propoxylated glyceryl tri(meth)acrylates, cyclohexyl (meth)acrylate, isobutyl (meth)acrylate, and tertiarybutyl (meth)acrylate.

Where the curable functional group on the compound of (d) is an ionically curable functional group examples include oxirane, thiirane, oxetane, vinyl ether, or N-vinyl carbazole.

Where the curable functional group on the compound of (d) is condensation curable examples include alkoxy silane and isocyanates, examples of which are given below.

Compounds of (d) may also possess two or more different reactive functionalities. For instance, compounds of (d) may be selected from

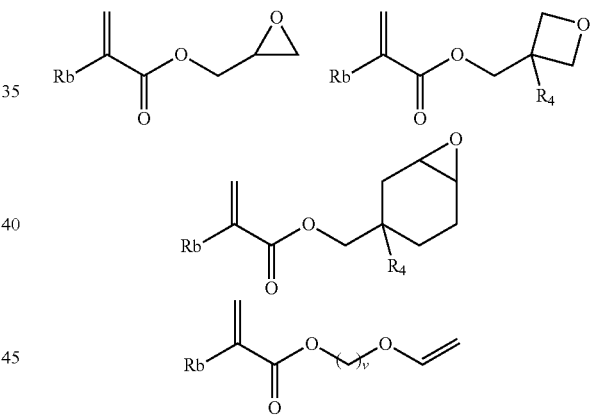

where Rb is H or alkyl, $R_4$ is alkyl, such as methyl or ethyl, and v is 2-4.

Compounds of (d) may also be selected from

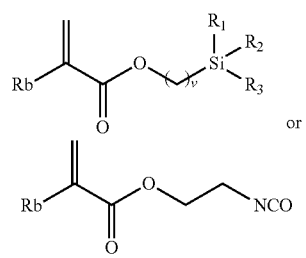

where $R_1$, $R_2$, and $R_3$ are the same or different and are selected from $C_{1-4}$ alkyl or alkoxy, Rb is H or alkyl, and v is 1-3.

The inventive composition may also include:

(a) a stabilizer package comprising at least one free radical stabilizer and at least one anionic stabilizer; and (b) optionally, one or more additives selected from cure accelerators, thickeners, thixotropes, tougheners, thermal resistance-conferring agents, adhesion promoters or plasticizers.

In another aspect the invention provides a method of preparing the so described compositions. For instance, the method includes providing in any order (a) at least one electron deficient olefin; (b) at least one compound having at least one electron deficient olefin functional group and at least one functional group selected from (i) (meth)acrylic esters, (ii) acrylonitriles, (iii) styryl functional groups, or (iv) electron deficient olefin functional groups; and (c) optionally, a cure system. The method may also include providing optional component (d) (at least one compound other than component (b) having at least one functional group selected from (i) (meth)acrylic esters, (ii) acrylonitriles, (iii) acrylamides, or (iv) styryl functional groups, and combinations thereof) and/or the stabilizer package and additives noted above.

In still another aspect the invention provides a method of using the so described compositions to bond together two or more substrates. The substrates may be constructed from a variety of materials, such as metals, ceramics, glasses, plastics, composites, woods, natural and synthetic rubbers, stone, textiles and fibers including carbon and inorganic fibers, non-woven fabrics leathers, living tissue including hair, skin and other organs and plant tissue.

In yet another aspect the invention provides reaction products of the so described compositions.

EXAMPLES

Example 1

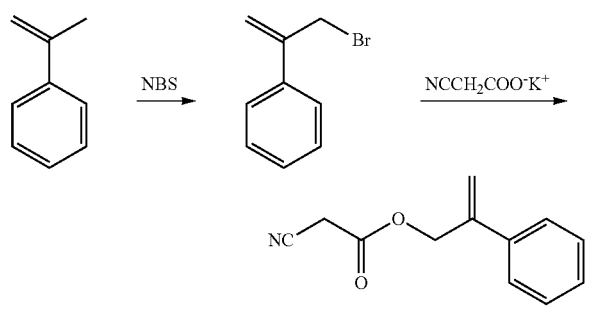

2-Phenylallyl bromide is prepared according to the method of Pines, Alul and Kolobieski, *J. Org. Chem.*, 22, 1113 (1957) via bromination of alpha-methylstyrene with N-bromosuccinimide.

An equimolar quantity of 2-phenylallyl bromide and the potassium salt of cyanoacetic acid are reacted in refluxing toluene stabilised by 3% hydroquinone. The reaction is monitored by GC and stopped when the consumption of the bromide is complete. The reaction mixture is cooled, filtered and concentrated in vacuo to yield an alpha-methylstyrene substituted cyanoacetate, shown in the reaction sequence above.

In a separate step, PRIMENE 81-R imine was prepared by reaction of PRIMENE 81-R amine with a stoichiometric equivalent of paraformaldehyde and removal of water of condensation. 1H NMR 60 MHz (CDCl$_3$) 2H s (br) 7.45 ppm and FTIR (1650 cm$^{-1}$).

Subsequently PRIMENE 81-R iminium-MSA was prepared from PRIMENE 81-R imine by adding dropwise with stirring methane sulfonic acid at ice water bath temperature, yielding a pale yellow iminium salt.

To a stirring mixture of PRIMENE 81-R iminium-MSA (5.86 g, 20 mmol) and an equimolar equivalent of the alpha-methylstyrene substituted cyanoacetate shown above, is added 1% of hydroquinone and the mixture is degassed for a period of time of 5 minutes at room temperature. Immediately thereafter, the degassed stirring mixture is vacuum distilled (0.2 mbar) at a temperature of 200° C. The styryl-substituted cyanoacrylate ester is collected as a distillate.

In Examples 2-5 below, the title compound sought is shown as a preface to the synthesis in each example to obtain the compound.

Example 2

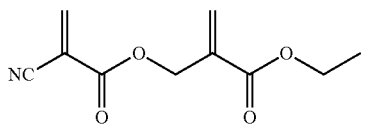

To a stirring mixture of PRIMENE 81-R iminium-MSA (5.86 g, 20 mmol) and

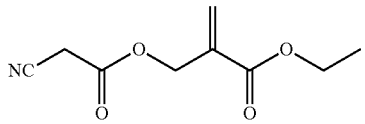

(g, 20 mmol), was added 10 mg of hydroquinone and degassed for a period of time of 5 minutes at room temperature. Immediately thereafter, the degassed stirring mixture was vacuum distilled (0.2 mbar) at a temperature of 200° C. The product shown above was collected as a colourless oil (60% purity by GC, 36% yield). $^1$H NMR (60 MHz, CDCl$_3$): δ 7.01 (s, 1H), 6.58 (s, 1H), 6.36 (s, 1H), 5.88 (s, 1H), 4.95 (s, 1H), 4.27 (q, J=6.6 Hz, 2H), 1.30 (t, J=6.6 Hz, 3H); FT-IR (film): 3125.4 (C=C), 2937.7, 2875.0, 2238.3 (CN), 1723.8 (b, s, CO), 1641.6 (C=C), 1389.2, 1310.6, 1155.5, 1026.7, 803.6 cm$^{-1}$.

Example 3

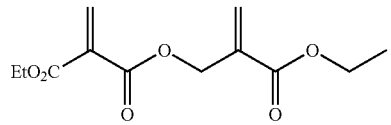 [SMILES: C=C(COC(=O)C(=C)C(=O)OCC)C(=O)OCC]

To a stirring mixture of PRIMENE 81-R iminium-MSA (2.93 g, 10 mmol) and

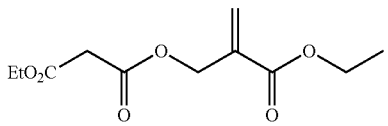 [SMILES: C=C(COC(=O)CC(=O)OCC)C(=O)OCC]

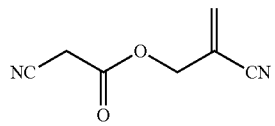

(2.44 g, 10 mmol), was added 10 mg of hydroquinone and degassed for a period of time of 5 minutes at room temperature. Immediately thereafter, the degassed stirring mixture was vacuum distilled (0.1 mbar) at a temperature of 200° C. The triester shown above was collected as a colourless oil (1.7 g, 110-120° C./0.1 mbar, 43% purity by GC, 28% yield). GC/MS shows the sample is a mixture of monomer and acetate (1:1.3); 1H NMR (60 MHz, CDCl$_3$): δ 6.51 (s, 1H), 6.34 (s, 2H), 5.86 (s, 1H), 4.94 (s, 1H), 4.39-4.04 (m, 4H), 1.42-1.18 (m, 6H); FT-IR (film): 2984.0, 2908.7, 1731.5, 1640.6, 1400.5, 1330.5, 1272.1, 1191.5, 1144.1, 1029.3, 813.1 cm$^{-1}$.

(1.50 g, 10 mmol), was added 10 mg of hydroquinone and degassed for a period of time of 5 minutes at room temperature. Immediately thereafter, the degassed stirring mixture was vacuum distilled (0.2 mbar) at a temperature of 200° C. The dinitrile ester shown above was collected as a colourless oil (0.96 g, 140-160° C./0.2-0.3 mbar, 43% purity by NMR, 25% yield). $^1$H NMR (60 MHz, CDCl$_3$): δ 7.04 (s, 1H), 6.64 (s, 1H), 6.12 (s, 2H), 4.82 (s, 2H); FT-IR (film): 3124.9, 2960.9, 2874.6, 2229.5, 1745.0, 1678.1, 1528.9, 1284.3, 1177.4, 955.0, 802.5 cm$^{-1}$.

Example 4

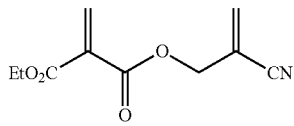

To a stirring mixture of PRIMENE 81-R iminium-MSA (2.93 g, 10 mmol) and

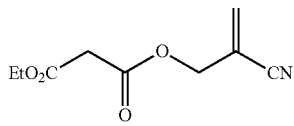

(1.97 g, 10 mmol), was added 10 mg of hydroquinone and degassed for a period of time of 5 minutes at room temperature. Immediately thereafter, the degassed stirring mixture was vacuum distilled (0.1 mbar) at a temperature of 200° C. The product shown above was collected as a colourless oil (1.7 g, 94-104° C./0.25-0.35 mbar, 80% purity by GC, 65% yield). $^1$H NMR (60 MHz, CDCl$_3$): δ 6.62 (s, 2H), 6.12 (s, 2H), 4.81 (s, 2H), 4.26 (q, J=6.0 Hz, 2H), 1.33 (t, J=6.0 Hz, 3H); FT-IR (film): 3118.4, 2985.8, 2229.9, 1736.1, 1628.7, 1407.3, 1371.9, 1331.0, 1191.8, 1030.2, 805.9 cm$^{-1}$.

Example 5

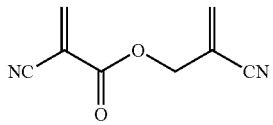

To a stirring mixture of PRIMENE 81-R iminium-MSA (2.93 g, 10 mmol) and

Example A

An adhesive formulation composition is made on a by weight basis from 85% ethylcyanoacrylate, 5% of the hybrid cyanoacryloyloxy-alphamethylethacrylate, 9% triethyleneglycol dimethacrylate, 1% hydroquinone and 50 ppm of methane sulfonic acid with stirring at room temperature.

Example B

An adhesive formulation composition is made on a by weight basis from 80% ethylcyanoacrylate, 10% of the hybrid cyanoacryloyloxy-alphamethylethacrylate, 9% triethyleneglycol dimethacrylate, 1% hydroquinone and 50 ppm of methane sulfonic acid with stirring at room temperature.

Example C

An adhesive formulation composition is made on a by weight basis from 50% ethylcyanoacrylate, 25% of the hybrid cyanoacryloyloxy-alphamethylethacrylate, 24% triethyleneglycol dimethacrylate, 1% hydroquinone and 50 ppm of methane sulfonic acid with stirring at room temperature.

Example D

An adhesive formulation composition is made on a by weight basis from 85% ethylcyanoacrylate, 5% of the hybrid cyanoacryloyloxy-methyl alphamethylacrylonitrile, 9% triethyleneglycol dimethacrylate, 1% hydroquinone and 50 ppm of methane sulfonic acid with stirring at room temperature.

Example E

An adhesive formulation composition is made on a by weight basis from 80% ethylcyanoacrylate, 10% of the hybrid cyanoacryloyloxy-methyl alphamethylacrylonitrile, 9% triethyleneglycol dimethacrylate, 1% hydroquinone and 50 ppm of methane sulfonic acid with stirring at room temperature.

Example F

An adhesive formulation composition is made on a by weight basis from 50% ethylcyanoacrylate, 25% of the hybrid cyanoacryloyloxy-methyl alphamethylacrylonitrile, 24% triethyleneglycol dimethacrylate, 1% hydroquinone and 50 ppm of methane sulfonic acid with stirring at room temperature.

Example G

An adhesive formulation composition is made on a by weight basis from 85% ethylcyanoacrylate, 5% of the hybrid cyanoacryloyloxyethylmethacrylate, 9% triethyleneglycol dimethacrylate, 1% hydroquinone and 50 ppm of methane sulfonic acid with stirring at room temperature.

Example H

An adhesive formulation composition is made on a by weight basis from 80% ethylcyanoacrylate, 10% of the hybrid cyanoacryloyloxyethylmethacrylate, 9% triethyleneglycol dimethacrylate, 1% hydroquinone and 50 ppm of methane sulfonic acid with stirring at room temperature.

Example I

An adhesive formulation composition is made on a by weight basis from 50% ethylcyanoacrylate, 25% of the hybrid cyanoacryloyloxyethylmethacrylate, 24% triethyleneglycol dimethacrylate, 1% hydroquinone and 50 ppm of methane sulfonic acid with stirring at room temperature.

Example J

An adhesive formulation composition is made on a by weight basis from 85% ethylcyanoacrylate, 2.5% of the hybrid cyanoacryloyloxy-alphamethylethacrylate, 2.5% 3-methacryloylpropyltrimethoxysilane, 9% triethyleneglycol dimethacrylate, 1% hydroquinone and 50 ppm of methane sulfonic acid with stirring at room temperature.

Example K

An adhesive formulation composition is made on a by weight basis from 85% ethylcyanoacrylate, 2.5% of the hybrid cyanoacryloyloxy-alphamethylethacrylate, 2.5% 3-methacryloylpropyltrimethoxysilane, 9% triethoxysilane terminated polysiloxane, 1% hydroquinone and 50 ppm of methane sulfonic acid with stirring at room temperature.

Example L

An adhesive formulation composition is made on a by weight basis from 85% ethylcyanoacrylate, 2.5% of the hybrid cyanoacryloyloxy-alphamethylethacrylate, 2.4% methylglycidyl methacrylate, 9% bisphenol-A-diglycidyl ether, and 1% hydroquinone with stirring at room temperature. Sulfur dioxide is used as stabiliser.

Example M

An adhesive formulation composition is made on a by weight basis from 85% ethylcyanoacrylate, 2.5% of the hybrid cyanoacryloyloxyethylmethacrylate, 2.4% methylglycidyl methacrylate, 9% bisphenol-A-diglycidyl ether, and 1% hydroquinone with stirring at room temperature. Sulfur dioxide is used as stabiliser.

Example N

A formulation containing 24% cyanoacryloyloxy-alphamethylethacrylate, 74% isobornylacrylate and 2% of Irgacure™ 184 was polymerised by exposure to radiation in the electromagnetic spectrum generated by UVALOC UV lamp operating primarily at 366 nm, for a period of time of 20 seconds. A polymer resulted that was insoluble in $CDCl_3$.

In a comparison under the same conditions, a formulation containing 24% of n-butyl cyanoacrylate, 74% isobornylacrylate and 2% of Irgacure™ 184 yielded a polymer after exposure to the same conditions. This polymer however was soluble in $CDCl_3$. 1H NMR analysis of the polymer made with n-butyl cyanoacrylate showed the cyanoacrylate vinyl protons to have disappeared with minor residual vinyl signals from the distinct isobornylacrylate.

Example O

Cyanoacryloyloxy-alphamethylethacrylate was polymerised with the radical initiator, AIBN. In solution, 0.7 mg of AIBN was used with 0.16 g of cyanoacryloyloxy-alphamethylethacrylate in 0.72 ml of THF. Anionic polymerisation was inhibited by washing the glassware with HCl, prior to use. Sealed tubes containing the three components were exposed to a temperature of 60° C. to thermally polymerise the composition.

$^1$H NMR analysis revealed polymer structures shown below were observed. The relative concentration of the cyclic lactone structures could be varied with conditions of polymerisation. Thus, in two solution polymerisation experiments, the second taking twice as long as the first at a temperature of 60° C., the following conversion results shown below were obtained. I is a six membered cyclic lactone, II is a five membered cyclic lactone, III is a polymer fragment with pendant acrylate functions, and IV is a polymer fragment with pendant cyanoacrylate functions.

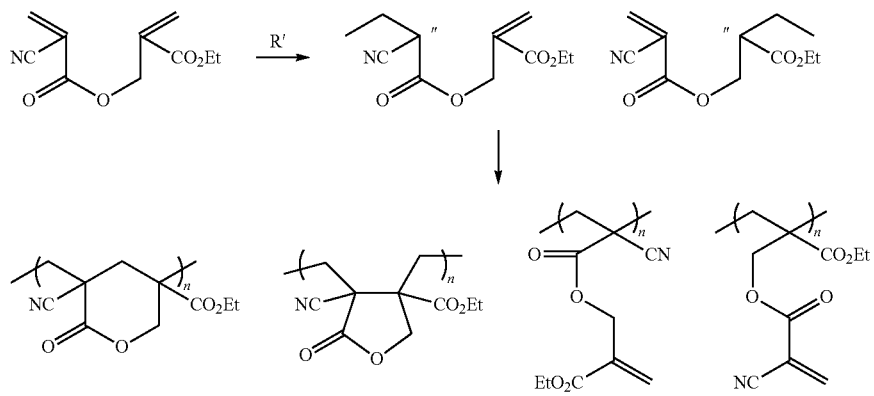

|      | I% | II% | III% | IV% |
|------|----|-----|------|-----|
| Run 1 |   | 41  | 51   | 8   |
| Run 2 |   | ~15 | 82   | 0   |

A similar reaction to that described above was performed with allylcyanoacrylate instead of cyanoacryloyloxy-alphamethylethacrylate, with all other components and reaction conditions remaining the same. Allylcyanaoacrylate is structurally related to cyanoacryloyloxy-alphamethylethacrylate. This reaction afforded soluble polymers without the characteristic 70 ppm —OCH$_2$— signal in $^{13}$C NMR attributed to γ-butyrolactone (I) or δ-valerolactone (II), that were distinct in the spectra of the soluble samples (low conversion) of the latter monomer.

Example P

Cyanoacryloyloxy-alphamethylethacrylate was radically copolymerised with methyl methacrylate (50:50 mol ratios) using conditions similar to those described above in Example O, Run 1. Here, soluble polymers were obtained but only at a very low conversion. The remaining portion of the reaction mixture was crosslinked. For the soluble portion, the polymer formed had a similar make up to the ratio of the initial feed of the two monomers (42:50) as determined by $^1$H NMR analysis.

Example Q

Radical photopolymerisation of cyanoacryloyloxy-alphamethylethacrylate using Irgacure™ 184 was carried out in a differential photocalorimeter (TA Instruments Q100). Polymerisation at a high conversion (>80%) was observed to occur in about 60 seconds.

Example R

An acid containing sample of cyanoacryloyloxy-alphamethylethacrylate was polymerised anionically by the addition of <0.5% of NaOH in dilute THF solution. The homopolymers formed were soluble.
Copolymerisation of cyanoacryloyloxy-alphamethylethacrylate with ethylcyanoacrylate was also initiated by NaOH in dilute THF solution.

Example S

N-Butyl cyanoacrylate and ethylcyanoacrylate were formulated with 2% by weight of Irgacure 184™ and used as controls. These controls were exposed to radiation in the electromagnetic spectrum generated from a UVALOC 1000 lamp. In the n-butyl cyanoacrylate sample no sign of cure was observed to occur even after 60 seconds of exposure to the radiation generated from the UVALOC 1000 lamp or when the sample was first heated to a temperature of 80° C. and then exposed for 60 seconds to the radiation generated from the UVALOC 1000 lamp. In the ethylcyanoacrylate sample, some "stringing" was observed after 20 seconds of exposure and after 60 seconds of exposure only a weak gel was observed.
Cyanoacryloyloxyethylmethacrylate was used as the basis for five samples formulated as described below.
S1: with 2% Irgacure 184™
S2: with 50% n-butylcyanoacrylate and 2% Irgacure 184™
S3: with 75% n-Butylcyanoacrylate and 2% Irgacure 184™
S4: with 50% ethylcyanoacrylate and 2% Irgacure 184™
S5: with 25% ethylcyanoacrylate and 2% Irgacure 184™
Each of the five samples was exposed to radiation in the electromagnetic spectrum generated from a UVALOC 1000 lamp as follows, and the results obtained are detailed below:
S1: 20 seconds; cured, dry to touch and completely insoluble in THF at room temperature even for protracted periods of time (>24 hours) or at elevated temperature.
S2: 20 seconds; gel.
40 seconds; insoluble polymer (THF).
S3: 20 seconds; still liquid.
40 seconds; partial cure.
60 seconds; cured (film insoluble in THF).
80 seconds; hard cured polymer insoluble in THF.
S4: 20 seconds; strong gel.
40 seconds; completely cured and insoluble in THF.
S5: 20 seconds; well cured and insoluble polymer.

Example T

An adhesive joint was made from sample S4 of Example S by applying a few drops of the sample to a glass substrate and mating it with another glass substrate to form an assembly with the substrates arranged in off setting manner and confining the sample. The assembly was exposed for 20 seconds to radiation in the electromagnetic spectrum generated from a UVALOC 1000 lamp. A strong bond was observed to form, with substrate failure outside the bonded area noted after stressing the assembly in tensile shear mode.

What is claimed is:
1. A curable composition comprising:
(a) at least one electron deficient olefin;
(b) in addition to the at least one electron deficient olefin of (a), at least one compound having at least one electron deficient olefin functional group and at least one additional functional group selected from
  (i) (meth)acrylic esters,
  (ii) acrylonitriles,
  (iii) acrylamides, or
  (iv) styryl functional groups;
(c) optionally, a cure system; and
(d) at least one compound other than compounds of (b) having at least one curable functional group other than an electron deficient olefin, wherein the compound of (b) is a member selected from the group consisting of

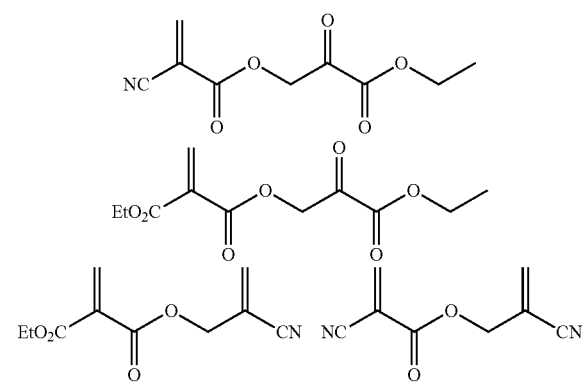

-continued

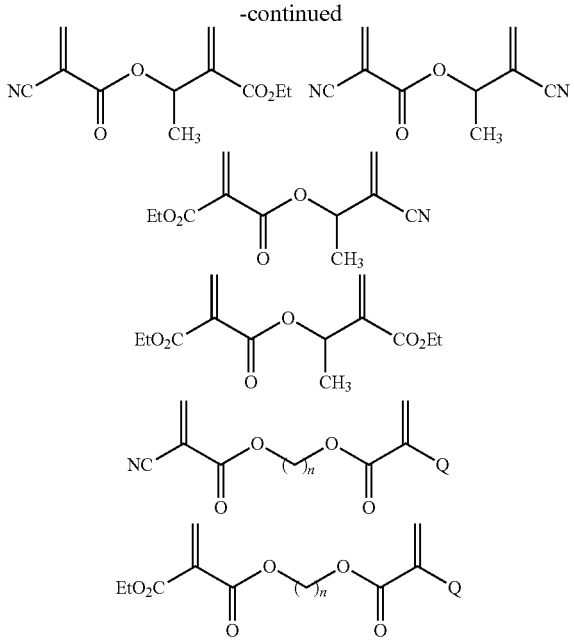

wherein n is 2, 3 or 4 and Q is H or CH$_3$, and wherein the compounds of (d) are selected from

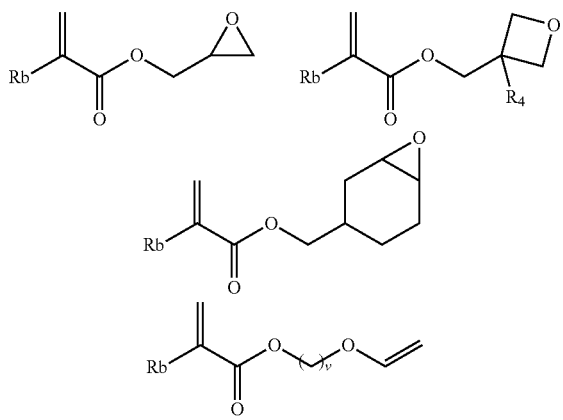

wherein Rb is H or alkyl, R$_4$ is alkyl, and v is 2-4.

2. The composition of claim 1, wherein the electron deficient olefin is a 2-cyanoacrylate within structure I:

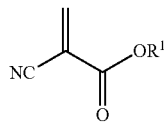

wherein R$^1$ is a member selected from the group consisting of C$_{1-16}$ alkyl, alkoxyalkyl, cycloalkyl, alkenyl, alkynyl, arylalkyl, aryl, allyl and haloalkyl groups.

3. The composition of claim 2, wherein the 2-cyanoacrylate is a member selected from the group consisting of methyl cyanoacrylate, ethyl cyanoacrylate, propyl cyanoacrylates, butyl cyanoacrylates, octyl cyanoacrylates, allyl cyanoacrylate, propargyl cyanoacrylate, β-methoxyethyl cyanoacrylate and combinations thereof.

4. The composition of claim 1, wherein the electron deficient olefin is a methylidene malonate within structure II:

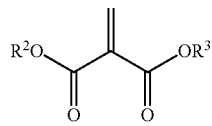

wherein R$^2$ and R$^3$ are each independently selected from alkyl, alkoxyalkyl, cycloalkyl, haloalkyl, alkenyl, alkynyl, aryl, arylalkyl, oxirane, episulfide, and oxetane groups.

5. The composition of claim 1, further comprising:
(a) a stabilizer package comprising at least one free radical stabilizer and at least one anionic stabilizer; and
(b) optionally, one or more additives selected from the group consisting of cure accelerators, thickeners, thixotropes, tougheners, thermal resistance-conferring agents, adhesion promoters and plasticizers.

6. The composition of claim 1, wherein the cure system is present and assists cure by a free radical mechanism, an ionic initiation, or a condensation reaction.

7. The composition of claim 5, wherein the cure system is triggered by exposure to photoirradiation, elevated temperature conditions, moisture, metal, air or anaerobic conditions and combinations thereof.

8. A curable composition comprising:
(a) at least one electron deficient olefin;
(b) in addition to the at least one electron deficient olefin of (a), at least one compound selected from the group consisting of

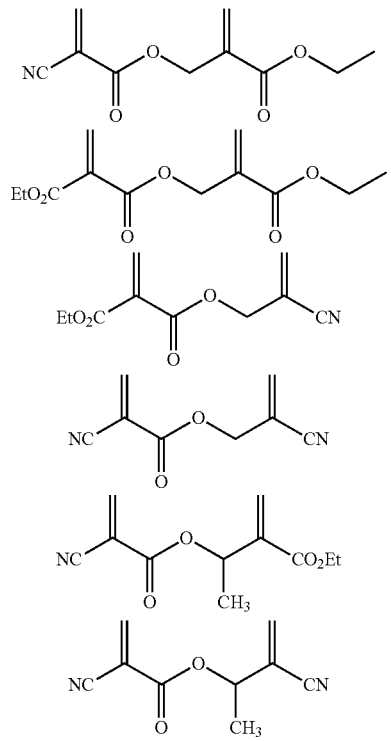

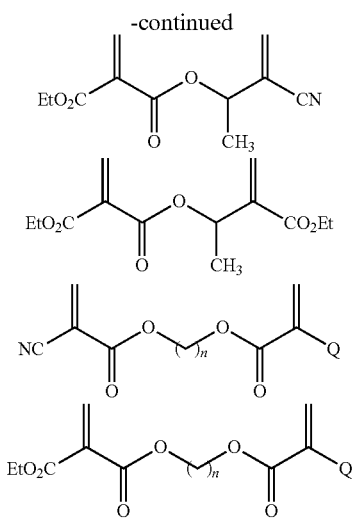

wherein n is 2, 3 or 4 and Q is H or CH₃;
(c) optionally, a cure system; and
(d) at least one compound other than compounds of (b) having at least one curable functional group other than an electron deficient olefin, wherein the compound of (d) is selected from

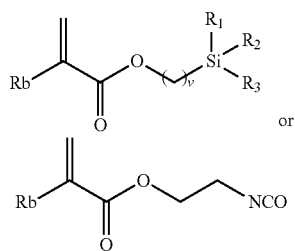

wherein $R_1$, $R_2$, and $R_3$ are the same or different and are selected from $C_{1-4}$ alkyl or alkoxy, Rb is H or alkyl, and v is 1-3.

9. The composition of claim 1, further comprising a compound having a curable functional group selected from (meth)acrylates, acrylonitriles, acrylamides, vinyls, allyls, styrenes, maleimides, itaconimides, and nadimides.

10. The composition of claim 9, wherein the (meth)acrylate compound is selected from 2(2-ethoxyethoxy) ethyl (meth)acrylate, 2-phenoxyethyl (meth)acrylate, 3,3,5 trimethylcyclohexyl (meth)acrylate, alkoxylated lauryl (meth)acrylate, alkoxylated phenol (meth)acrylate, alkoxylated tetrahydrofurfuryl (meth)acrylate, caprolactone (meth)acrylate, cyclic trimethylolpropane formal (meth)acrylate, dicyclopentadienyl (meth)acrylate, diethylene glycol methyl ether (meth)acrylate, ethoxylated hydroxyethyl (meth)acrylates, ethoxylated nonyl phenol (meth)acrylates, isobornyl (meth)acrylate, isodecyl (meth)acrylate, isooctyl (meth)acrylate, lauryl (meth)acrylate, methoxy polyethylene glycol mono(meth)acrylates, octyldecyl (meth)acrylate, propoxylated allyl (meth)acrylates, stearyl (meth)acrylate, tetrahydrofurfuryl (meth)acrylates, tridecyl (meth)acrylate, triethylene glycol ethyl ether (meth)acrylates, 1,12-dodecanediol di(meth)acrylate, 1,3-butylene glycol di(meth)acrylate, 1,4-butanediol di(meth)acrylate, 1,6-hexanediol di(meth)acrylate, alkoxylated aliphatic di(meth)acrylate, alkoxylated cyclohexane dimethanol di(meth)acrylate, alkoxylated hexanediol di(meth)acrylate, alkoxylated neopentyl glycol di(meth)acrylate, cyclohexane dimethanol di(meth)acrylate, diethylene glycol di(meth)acrylate, dipropylene glycol di(meth)acrylate, ethoxylated bisphenol a di(meth)acrylates, ethylene glycol di(meth)acrylate, neopentyl glycol di(meth)acrylate, polyethylene glycol di(meth)acrylates, polypropylene glycol di(meth)acrylates, tetraethylene glycol di(meth)acrylate, tricyclodecane dimethanol di(meth)acrylate, triethylene glycol di(meth)acrylate, tripropylene glycol di(meth)acrylate, di-trimethylolpropane tetra(meth)acrylate, dipentaerythritol penta(meth)acrylate, ethoxylated pentaerythritol tetra(meth)acrylates, pentaerythritol tetra(meth)acrylate, ethoxylated trimethylolpropane tri(meth)acrylates, pentaerythritol tri(meth)acrylate, propoxylated glyceryl tri(meth)acrylates, cyclohexyl (meth)acrylate, isobutyl (meth)acrylate, and tertiary-butyl (meth)acrylate.

11. The composition of claim 8, wherein the electron deficient olefin is a 2-cyanoacrylate within structure I:

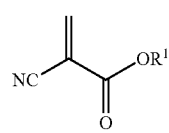

wherein $R^1$ is a member selected from the group consisting of $C_{1-16}$ alkyl, alkoxyalkyl, cycloalkyl, alkenyl, alkynyl, arylalkyl, aryl, allyl and haloalkyl groups.

12. The composition of claim 8, wherein the electron deficient olefin is a 2-cyanoacrylate selected from the group consisting of methyl cyanoacrylate, ethyl cyanoacrylate, propyl cyanoacrylates, butyl cyanoacrylates, octyl cyanoacrylates, allyl cyanoacrylate, propargyl cyanoacrylate, β-methoxyethyl cyanoacrylate and combinations thereof.

13. The composition of claim 8, wherein the electron deficient olefin is a methylidene malonate within structure II:

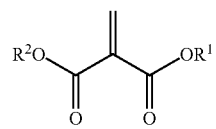

wherein $R^2$ and $R^3$ are each independently selected from alkyl, alkoxyalkyl, cycloalkyl, haloalkyl, alkenyl, alkynyl, aryl, arylalkyl, oxirane, episulfide, and oxetane groups.

14. The composition of claim 8, further comprising:
(a) a stabilizer package comprising at least one free radical stabilizer and at least one anionic stabilizer; and
(b) optionally, one or more additives selected from the group consisting of cure accelerators, thickeners, thixotropes, tougheners, thermal resistance-conferring agents, adhesion promoters and plasticizers.

15. The composition of claim 8, wherein the cure system is present and assists cure by a free radical mechanism, an ionic initiation, or a condensation reaction.

16. The composition of claim 14, wherein the cure system is triggered by exposure to photoirradiation, elevated temperature conditions, moisture, metal, air or anaerobic conditions and combinations thereof.

17. The composition of claim 8, further comprising a compound having a curable functional group selected from (meth)acrylates, acrylonitriles, acrylamides, vinyls, allyls, styrenes, maleimides, itaconimides, and nadimides.

18. The composition of claim 17, wherein the (meth) acrylate compound is selected from 2(2-ethoxyethoxy) ethyl (meth)acrylate, 2-phenoxyethyl (meth)acrylate, 3,3,5 trimethylcyclohexyl (meth)acrylate, alkoxylated lauryl (meth) acrylate, alkoxylated phenol (meth)acrylate, alkoxylated tetrahydrofurfuryl (meth)acrylate, caprolactone (meth) acrylate, cyclic trimethylolpropane formal (meth)acrylate, dicyclopentadienyl (meth)acrylate, diethylene glycol methyl ether (meth)acrylate, ethoxylated hydroxyethyl (meth)acrylates, ethoxylated nonyl phenol (meth)acrylates, isobornyl (meth)acrylate, isodecyl (meth)acrylate, isooctyl (meth) acrylate, lauryl (meth)acrylate, methoxy polyethylene glycol mono(meth)acrylates, octyldecyl (meth)acrylate, propoxylated allyl (meth)acrylates, stearyl (meth)acrylate, tetrahydrofurfuryl (meth)acrylates, tridecyl (meth)acrylate, triethylene glycol ethyl ether (meth)acrylates, 1,12-dodecanediol di(meth)acrylate, 1,3-butylene glycol di(meth)acrylate, 1,4-butanediol di(meth)acrylate, 1,6-hexanediol di(meth)acrylate, alkoxylated aliphatic di(meth)acrylate, alkoxylated cyclohexane dimethanol di(meth)acrylate, alkoxylated hexanediol di(meth)acrylate, alkoxylated neopentyl glycol di(meth)acrylate, cyclohexane dimethanol di(meth)acrylate, diethylene glycol di(meth)acrylate, dipropylene glycol di(meth)acrylate, ethoxylated bisphenol a di(meth)acrylates, ethylene glycol di(meth)acrylate, neopentyl glycol di(meth) acrylate, polyethylene glycol di(meth)acrylates, polypropylene glycol di(meth)acrylates, tetraethylene glycol di(meth) acrylate, tricyclodecane dimethanol di(meth)acrylate, triethylene glycol di(meth)acrylate, tripropylene glycol di(meth)acrylate, di-trimethylolpropane tetra(meth)acrylate, dipentaerythritol penta(meth)acrylate, ethoxylated pentaerythritol tetra(meth)acrylates, pentaerythritol tetra(meth) acrylate, ethoxylated trimethylolpropane tri(meth)acrylates, pentaerythritol tri(meth)acrylate, propoxylated glyceryl tri (meth)acrylates, cyclohexyl (meth)acrylate, isobutyl (meth) acrylate, and tertiary-butyl (meth)acrylate.

* * * * *

UNITED STATES PATENT AND TRADEMARK OFFICE
CERTIFICATE OF CORRECTION

PATENT NO. : 10,196,471 B1  
APPLICATION NO. : 12/603966  
DATED : February 5, 2019  
INVENTOR(S) : Stefano Gherardi, Ciaran B. McArdle and Ligang Zhao Page 1 of 1

It is certified that error appears in the above-identified patent and that said Letters Patent is hereby corrected as shown below:

In the Specification

Column 6, Line 34, change "acrylamindes" to -- acrylamides --.

Column 7, Line 22, change "acrylamindes" to -- acrylamides --.

In the Claims

Column 22, Line 45, change " 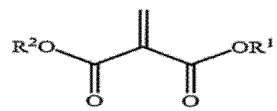 " to -- 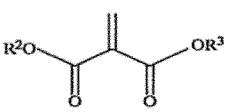 --.

Signed and Sealed this  
Eighth Day of October, 2019

Andrei Iancu  
*Director of the United States Patent and Trademark Office*